United States Patent
Jang et al.

(10) Patent No.: US 8,410,650 B2
(45) Date of Patent: Apr. 2, 2013

(54) HYDRODYNAMIC BEARING ASSEMBLY AND MOTOR INCLUDING THE SAME

(75) Inventors: Ho Kyung Jang, Gyunggi-do (KR); Il Oung Park, Seoul (KR); Jong Rycol Oh, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 630 days.

(21) Appl. No.: 12/654,366

(22) Filed: Dec. 17, 2009

(65) Prior Publication Data

US 2011/0050015 A1 Mar. 3, 2011

(30) Foreign Application Priority Data

Aug. 27, 2009 (KR) .......................... 10-2009-0080021

(51) Int. Cl.
*H02K 5/16* (2006.01)
(52) U.S. Cl. .......................................................... 310/90
(58) Field of Classification Search .................... 310/90, 310/90.5; 384/100
See application file for complete search history.

(56) References Cited

U.S. PATENT DOCUMENTS

| 5,558,445 | A | * | 9/1996 | Chen et al. | 384/132 |
| 5,977,676 | A | * | 11/1999 | Wijdenes | 310/90 |
| 6,079,879 | A | * | 6/2000 | Takahashi | 384/119 |
| 6,126,320 | A | * | 10/2000 | Ichiyama | 384/112 |
| 6,250,808 | B1 | * | 6/2001 | Ichiyama | 384/100 |
| 6,357,916 | B2 | * | 3/2002 | Saeki et al. | 384/100 |

FOREIGN PATENT DOCUMENTS

| JP | 2003-042143 | 2/2003 |
| JP | 2006-064041 | 3/2006 |

* cited by examiner

*Primary Examiner* — Nguyen N Hanh

(57) ABSTRACT

A hydrodynamic bearing assembly includes a sleeve rotatably supporting a shaft, a thrust plate housing portion extending to an upper side of the sleeve in an axial direction so as to house a thrust plate, and a stopper ring housing portion stepped in an upper side of the thrust plate housing portion in the axial direction and housing a stopper ring for fixing the thrust plate. The stopper ring protrudes from the stopper ring housing portion such that an outer circumferential surface of the stopper ring has a larger height than an inner circumferential surface of the stopper ring housing portion.

14 Claims, 4 Drawing Sheets

| No. | HEIGHT DIFFERENCE[G, mm] | | | | |
|---|---|---|---|---|---|
| | -0.100 | -0.050 | 0.000 | 0.050 | 0.100 |
| 1 | 0.021 | 0.013 | 0.001 | 0.001 | 0.003 |
| 2 | 0.018 | 0.012 | 0.003 | 0.001 | 0.001 |
| 3 | 0.019 | 0.014 | 0.005 | 0.003 | 0.004 |
| 4 | 0.018 | 0.014 | 0.005 | 0.000 | 0.004 |
| AVERAGE | 0.019 | 0.013 | 0.0035 | 0.00125 | 0.003 |

HYDRODYNAMIC BEARING ASSEMBLY AND MOTOR INCLUDING THE SAME

CROSS-REFERENCE TO RELATED APPLICATIONS

This application claims the priority of Korean Patent Application No. 10-2009-0080021 filed on Aug. 27, 2009, in the Korean Intellectual Property Office, the disclosure of which is incorporated herein by reference.

BACKGROUND OF THE INVENTION

1. Field of the Invention

The present invention relates to a hydrodynamic bearing assembly and a motor including the same, and more particularly, to a hydrodynamic bearing assembly and a motor including the same, in which a stopper ring is set to protrude from a stopper ring housing portion to increase the flatness of the stopper ring, when welding the stopper ring for fixing a thrust plate and the stopper ring housing portion of a sleeve which is stepped for housing the stopper ring.

2. Description of the Related Art

Small-sized spindle motors used in recording disc driving devices are being applied to various portable products such as netbooks, mobile phones, portable multimedia players (PMP), game machines, and MP3 players.

Recently, as the performance of recording disc driving devices has improved, demand for low current, low Non Repeatable Run Out (NNRO), impact resistance, and vibration resistance has rapidly increased in the field of spindle motors used in the driving devices.

Meanwhile, when press-processed parts are assembled into a motor, laser welding may be applied in order to ensure good oil sealing characteristics, bonding strength, and convenience of assembling operation.

However, press-processed parts have low level precision and are affected by expansion and contraction caused by heat during a welding process, and may generate residual stress.

In particular, when a stopper ring for fixing a press-processed thrust plate is disposed in a stopper ring housing portion of a sleeve to perform welding, a gap may be formed between the stopper ring housing portion and the stopper ring due to a round portion formed on an outer circumference of the stopper ring disposed inside the stopper ring housing portion. In this case, poor quality welds may occur.

Furthermore, the stopper ring may be raised from the stopper ring housing portion, as the welding material hardens. In this case, after welding, the flatness of the upper surface of the stopper ring may be degraded.

SUMMARY OF THE INVENTION

An aspect of the present invention provides a hydrodynamic bearing assembly and a motor including the same, in which a stopper ring is set to protrude from a stopper ring housing portion to increase the flatness of the stopper ring, when welding the stopper ring for fixing a thrust plate and the stopper ring housing portion of a sleeve which is stepped to house the stopper ring.

According to an aspect of the present invention, there is provided a hydrodynamic bearing assembly including: a sleeve rotatably supporting a shaft; a thrust plate housing portion extending to an upper side of the sleeve in an axial direction so as to house a thrust plate; and a stopper ring housing portion stepped in an upper side of the thrust plate housing portion in the axial direction and housing a stopper ring for fixing the thrust plate. The stopper ring protrudes from the stopper ring housing portion such that an outer circumferential surface of the stopper ring has a larger height than an inner circumferential surface of the stopper ring housing portion.

A height difference between the outer circumferential surface of the stopper ring and the inner circumferential surface of the stopper ring housing portion may be within the range of 0 μm to 100 μm.

The stopper ring may have a bottom surface which is formed to accomplish oil sealing between the bottom surface and a top surface of the thrust plate.

The stopper ring housing portion may be stepped in an outer-diameter direction from the thrust plate housing portion.

The stopper ring may cover at least a part of the thrust plate in an inner-diameter direction from an outer circumference of the thrust plate.

The stopper ring may be press-processed, and the corners of an outer circumference thereof may be rounded off.

According to another aspect of the present invention, there is provided a motor including a shaft inserted into a sleeve to be rotatably installed; a rotor forcibly inserted into the shaft and including a magnet facing a winding coil of a stator; the sleeve rotatably supporting the shaft; a thrust plate housing portion extending to an upper side of the sleeve in an axial direction so as to house a thrust plate; and a stopper ring housing portion stepped in an upper side of the thrust plate housing portion in the axial direction and housing a stopper ring for fixing the thrust plate. The stopper ring protrudes from the stopper ring housing portion such that an outer circumferential surface of the stopper ring has a larger height than an inner circumferential surface of the stopper ring housing portion.

A height difference between the outer circumferential surface of the stopper ring and the inner circumferential surface of the stopper ring housing portion may be within the range of 0 μm to 100 μm.

The stopper ring may have a bottom surface which is formed to accomplish oil sealing between the bottom surface and a top surface of the thrust plate.

The stopper ring housing portion may be stepped in an outer-diameter direction from the thrust plate housing portion.

The stopper ring may cover at least a part of the thrust plate in an inner-diameter direction from an outer circumference of the thrust plate.

The stopper ring may be press-processed, and the corners of an outer circumference thereof may be rounded off.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
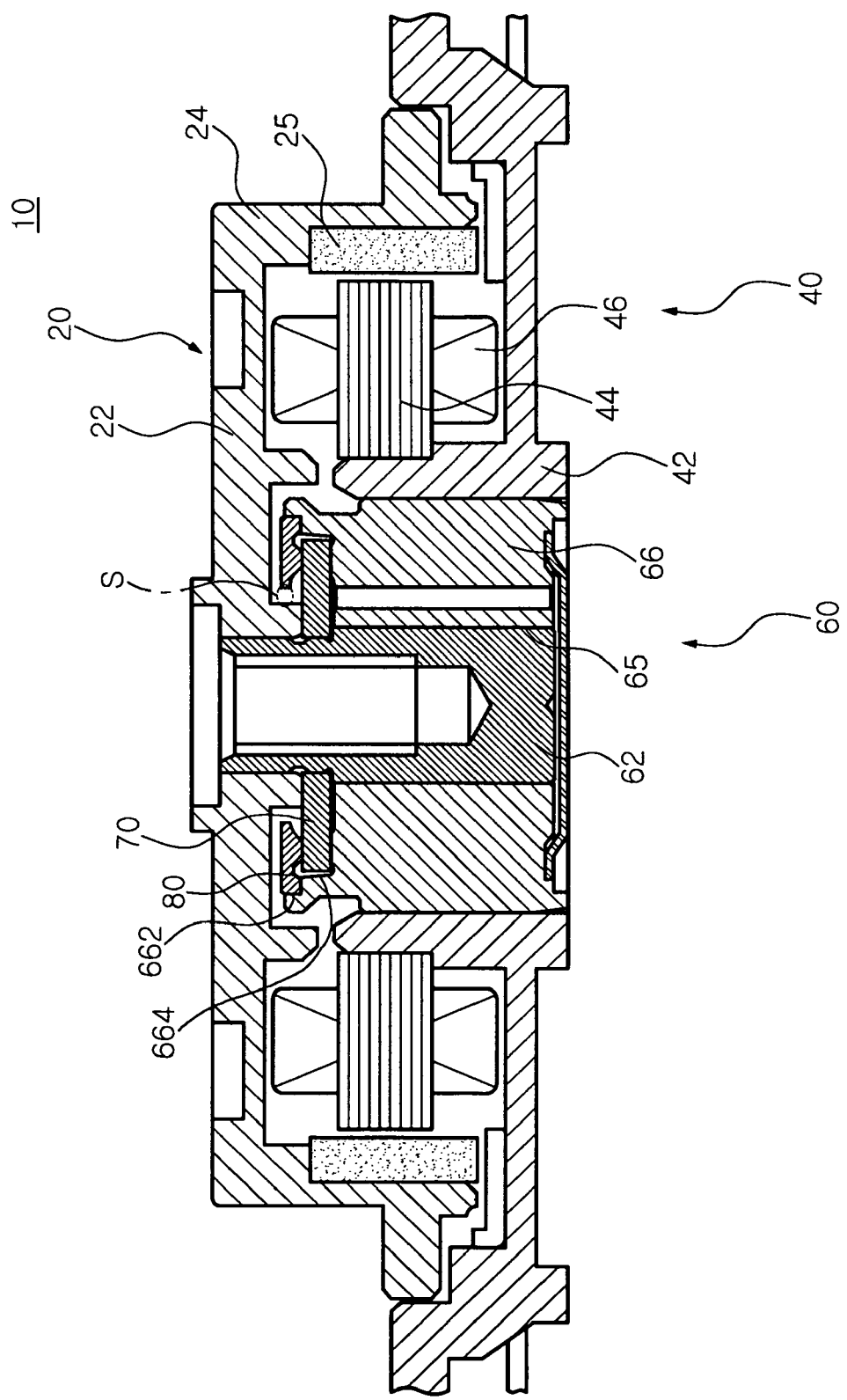
FIG. 1 is a schematic cross-sectional view of a motor according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

FIG. 1 is a schematic cross-sectional view of a motor according to an embodiment of the present invention.

Referring to FIG. 1, the motor 10 according to the embodiment of the present invention includes a rotor 20, a stator 40, and a bearing assembly 60.

The rotor 20 includes a cup-shaped rotor case 22 having a ring-shaped magnet 25 provided on an outer circumference 24 thereof, the magnet 25 corresponding to a coil 46 of the stator 40. The magnet 25 is a permanent magnet in which N poles and S poles are alternately magnetized in a circumferential direction to generate a predetermined magnetic force.

The stator 40 includes a support portion 42 into which the outer diameter of a sleeve 66 fits, a plurality of cores 44 fixed to the support portion 42, and a coil 46 surrounding the cores 44.

The rotor 20 is rotated by an electromagnetic interaction between the coil 46 and the magnet 24.

The bearing assembly 60 disposed inside the support portion 42 of the stator 40 includes a shaft 62 supporting the rotation of the rotor 20 and the sleeve 66 into which the shaft 62 is inserted and fitted and which supports the shaft 62 such that an upper end of the shaft 62 protrudes upward in an axial direction.

The shaft 62 is inserted with a short gap provided between the shaft 62 and a shaft hole 65 of the sleeve 66. The short gap is filled with oil, and the rotation of the rotor 20 may be more smoothly supported by a dynamic pressure generated by a radial dynamic pressure groove formed on an inner circumference of the sleeve 66.

Meanwhile, terms in regards to directions may be defined as follows. In FIG. 1, the axial direction means a vertical direction with the shaft 62 set to a reference point, and an inner or outer diameter direction means an outer-end direction of the rotor 20 with the shaft 62 set to a reference point or a central direction of the shaft 62 with an outer end of the rotor 20 set to a reference point.

The motor 10 includes a thrust plate 70 disposed at an upper side of the bearing assembly 60 in the axial direction of the sleeve 66. The thrust plate 70 is housed in a thrust plate housing portion 664 formed in the sleeve 66. The thrust plate 70 has a thrust dynamic pressure groove for providing a thrust dynamic pressure to the shaft 62.

Further, a stopper ring housing portion 662 is formed in the upper side of the thrust plate housing portion 664 in the axial direction so as to be stepped in the sleeve 66. The stopper ring housing portion 662 may house a stopper ring 80 fixing the thrust plate 70.

The stopper ring 80 is set to protrude from the stopper ring housing portion 662 such that an outer-diameter outer circumferential surface of the stopper ring 80 has a larger height than an inner-diameter inner circumferential surface of the stopper ring housing portion 662.

Hereinafter, the shapes of the stopper ring 80 and the stopper ring housing portion 662, the welding of the stopper ring 80 and the stopper ring housing portion 662, and the welding result will be described in detail.

Figure 2:
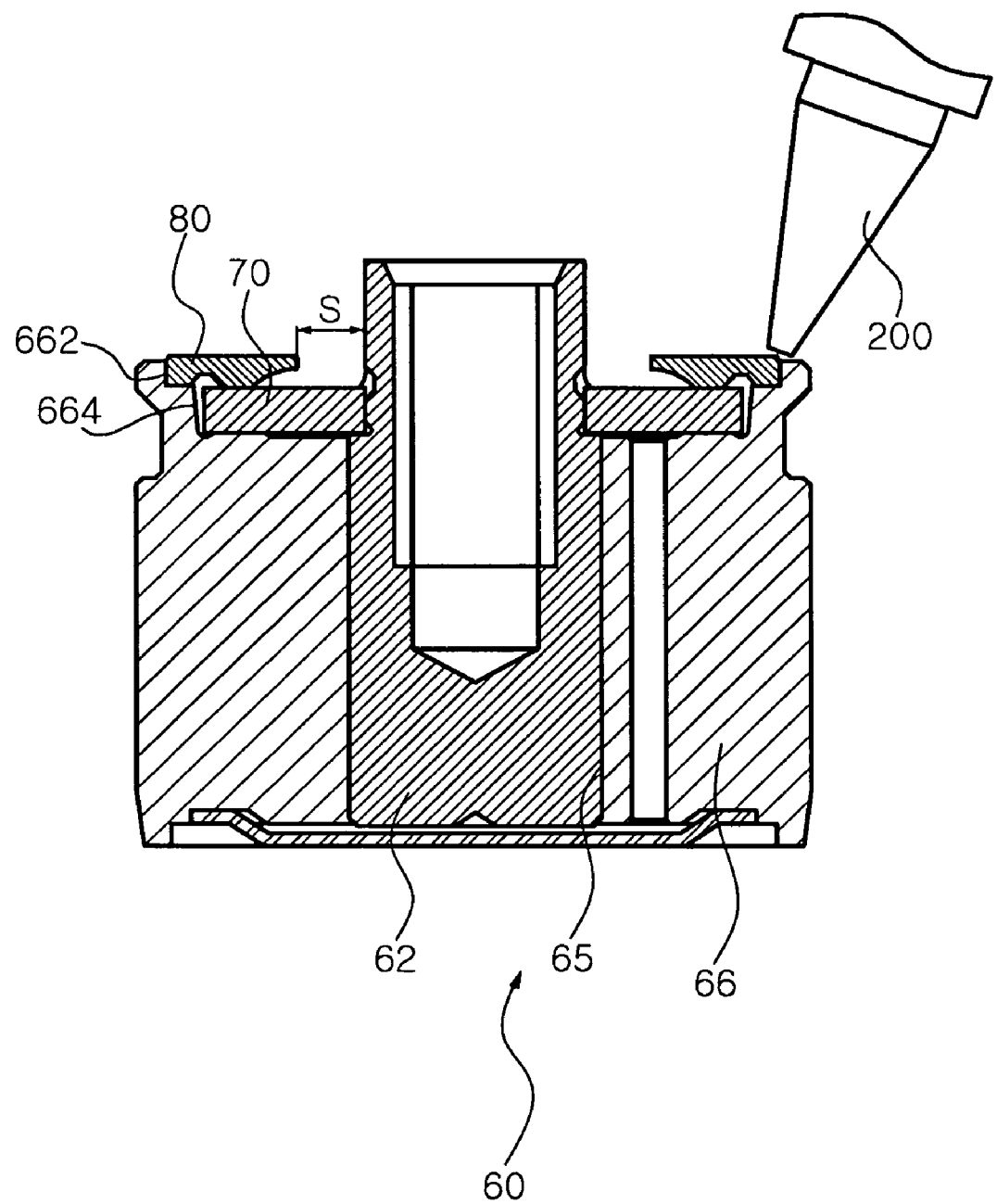
FIG. 2 is a schematic cross-sectional view of a hydrodynamic bearing assembly according to an embodiment of the preset invention, to which a welding machine is applied.
Figures 3, 4:
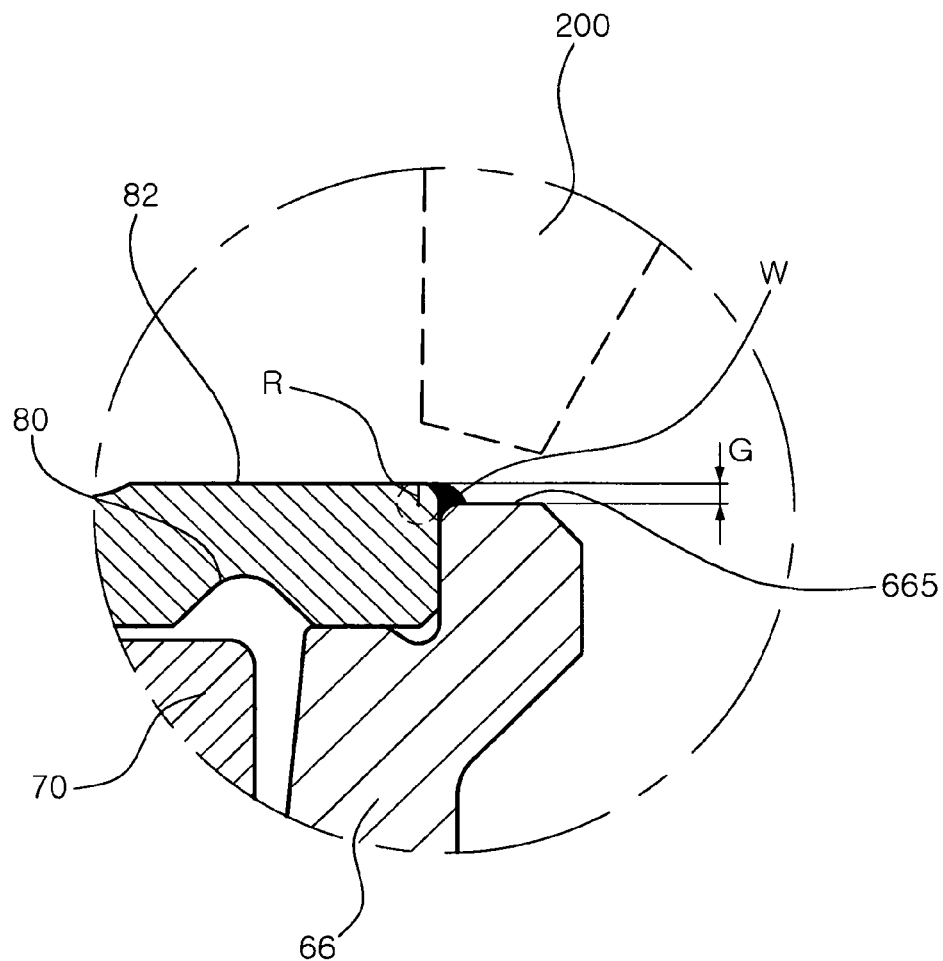
FIG. 3 is an expanded cross-sectional view of a welded portion of FIG. 2.
FIG. 4 is a table showing an average of flatnesses of an upper surface of a stopper ring depending on a height difference G formed between the stopper ring and a stopper ring housing portion inside a sleeve.

FIG. 2 is a schematic cross-sectional view of the hydrodynamic bearing assembly according to the embodiment of the preset invention, to which a welding machine is applied. FIG. 3 is an expanded cross-sectional view of a welded portion of FIG. 2.

Referring to FIGS. 2 and 3, the hydrodynamic bearing assembly 60 according to the embodiment of the present invention includes the sleeve 66, the thrust plate housing portion 664, and the stopper ring housing portion 662.

The sleeve 66 rotatably supports the shaft 62.

The thrust plate housing portion 664 is formed so as to extend to the upper side of the sleeve 66 in the axial direction, and houses the thrust plate 70 for providing a thrust dynamic pressure to the shaft 62.

The stopper ring housing portion 662 is formed so as to be stepped in the upper side of the thrust plate housing portion 664 in the axial direction, and houses the stopper ring 80 for fixing the thrust plate 70.

The stopper ring 80, which is press-processed, forms a predetermined space S with the shaft 62 in the inner-diameter direction. As the predetermined space S is formed, oil provided between a top surface of the thrust plate 70 and a bottom surface of the stopper ring 80 in the axial direction is prevented from flowing into the outer circumference of the shaft 62.

The stopper ring 80 protrudes from the stopper ring housing portion 662 such that the outer circumferential surface of the stopper ring 80 has a larger height than the inner circumferential surface of the stopper ring housing portion 662. That is, a height difference G is formed between an upper surface 82 of the stopper ring 80 and an upper surface 665 of the stopper ring housing portion 662.

The height difference G between the upper surfaces 80 and 665 may be set within the range of 0 μm to 100 μm. In this case, the stopper ring 80 may cover at least a part of the thrust plate 70 in the inner-diameter direction from the outer circumference of the thrust plate 70.

The stopper ring 80 is press-processed, and the corners of the outer circumference thereof may be rounded off.

Then, welding W is performed on a stepped portion formed by the height difference G between the outer circumference of the stopper ring 80 and the inner circumference of the stopper housing portion 662.

At this time, the welding is inclined position welding which is performed in such a state that a welding rod 200 is inclined, and is laser welding.

Figure 5:
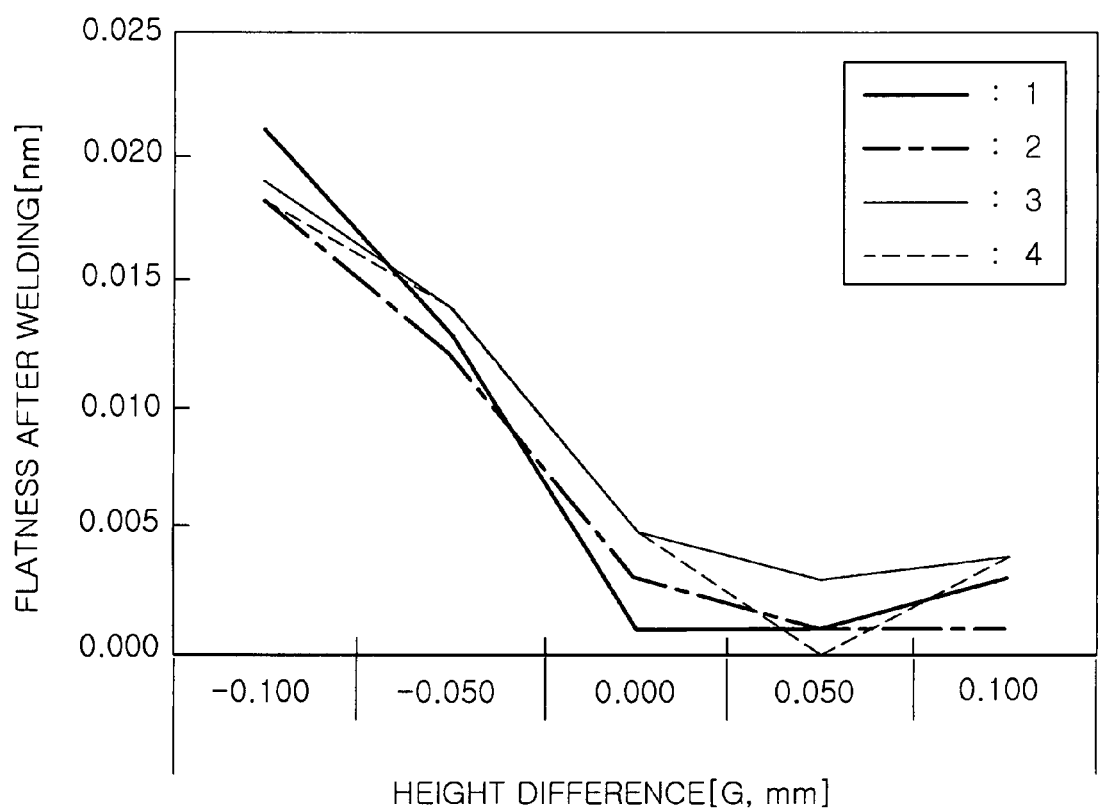
FIG. 5 is a graph showing the result of FIG. 4.

FIG. 4 is a table showing an average of flatnesses of the upper surface of the stopper ring depending on the height difference G formed between the stopper ring and the stopper ring housing portion inside the sleeve, and FIG. 5 is a graph showing the result of FIG. 4.

FIG. 4 shows the results obtained by measuring the flatness of the upper surface of the stopper ring 80, when the welding W is performed while changing the height difference G between the stopper ring 80 and the stopper ring housing portion 664, as shown in FIG. 3.

FIG. 4 is a table showing the results obtained by measuring flatnesses of four samples, and FIG. 5 is a graph of FIG. 4. When the height difference G is negative (−, G<0), that is, when the stopper ring 80 is disposed inside the stopper ring housing portion 664, the flatness of the stopper ring is large.

Further, it can be seen that when the height difference G is within the range of 0 µm to 100 µm (0 µm<G<100 µm), the flatness approaches a figure which is substantially zero.

In the hydrodynamic bearing assembly and the motor including the same according to the embodiments of the present invention, poor quality welds is reduced because welding is performed in a state in which a gap is not formed between the stopper ring and the stopper ring housing portion.

Furthermore, since welding is performed in a state in which the stopper ring is sealed in the stopper ring housing portion, the stopper ring is not raised. Therefore, the flatness of the upper surface of the stopper ring increases after the welding.

While the present invention has been shown and described in connection with the exemplary embodiments, it will be apparent to those skilled in the art that modifications and variations can be made without departing from the spirit and scope of the invention as defined by the appended claims.

What is claimed is:

1. A hydrodynamic bearing assembly comprising:
   a sleeve rotatably supporting a shaft;
   a thrust plate housing portion extending to an upper side of the sleeve in an axial direction so as to house a thrust plate;
   a stopper ring housing portion stepped in an upper side of the thrust plate housing portion in the axial direction and housing a stopper ring for fixing the thrust plate,
   the stopper ring protruding from the stopper ring housing portion such that a step portion in an outer circumferential surface of the stopper ring having a larger height than an inner circumferential surface of the stopper ring housing portion is formed; and
   a welding portion formed on the step portion covering the outer circumferential surface of the stopper ring and the upper circumferential surface of the stopper ring housing portion all together.

2. The hydrodynamic bearing assembly of claim 1, wherein a height difference between the outer circumferential surface of the stopper ring and the inner circumferential surface of the stopper ring housing portion is within the range of 0 µm to 100 µm.

3. The hydrodynamic bearing assembly of claim 1, wherein the stopper ring has a bottom surface which is formed to accomplish oil sealing between the bottom surface and a top surface of the thrust plate.

4. The hydrodynamic bearing assembly of claim 1, wherein the stopper ring housing portion is stepped in an outer-diameter direction from the thrust plate housing portion.

5. The hydrodynamic bearing assembly of claim 1, wherein the stopper ring covers at least a part of the thrust plate in an inner-diameter direction from an outer circumference of the thrust plate.

6. The hydrodynamic bearing assembly of claim 1, wherein the stopper ring is press-processed, and the corners of an outer circumference thereof are rounded off.

7. The hydrodynamic bearing assembly of claim 1, wherein the outer circumferential surface of the stopper ring is in contact with the inner circumferential surface of the stopper ring housing portion.

8. A motor comprising:
   a shaft inserted into a sleeve to be rotatably installed;
   a rotor forcibly inserted into the shaft and comprising a magnet facing a winding coil of a stator;
   the sleeve rotatably supporting the shaft;
   a thrust plate housing portion extending to an upper side of the sleeve in an axial direction so as to house a thrust plate;
   a stopper ring housing portion stepped in an upper side of the thrust plate housing portion in the axial direction and housing a stopper ring for fixing the thrust plate,
   the stopper ring protruding from the stopper ring housing portion such that a step portion in an outer circumferential surface of the stopper ring having a larger height than an inner circumferential surface of the stopper ring housing portion is formed; and
   a welding portion formed on the step portion covering the outer circumferential surface of the stopper ring and the upper circumferential surface of the stopper ring housing portion all together.

9. The motor of claim 8, wherein a height difference between the outer circumferential surface of the stopper ring and the inner circumferential surface of the stopper ring housing portion is within the range of 0 µm to 100 µm.

10. The motor of claim 8, wherein the stopper ring has a bottom surface which is formed to accomplish oil sealing between the bottom surface and a top surface of the thrust plate.

11. The motor of claim 8, wherein the stopper ring housing portion is stepped in an outer-diameter direction from the thrust plate housing portion.

12. The motor of claim 8, wherein the stopper ring covers at least a part of the thrust plate in an inner-diameter direction from an outer circumference of the thrust plate.

13. The motor of claim 8, wherein the stopper ring is press-processed, and the corners of an outer circumference thereof are rounded off.

14. The motor of claim 8, wherein the outer circumferential surface of the stopper ring is in contact with the inner circumferential surface of the stopper ring housing portion.

\* \* \* \* \*